(12) United States Patent
Mizusawa

(10) Patent No.: US 7,746,566 B2
(45) Date of Patent: Jun. 29, 2010

(54) OBSERVATION OPTICAL SYSTEM

(75) Inventor: Masayuki Mizusawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 137 days.

(21) Appl. No.: 12/099,539

(22) Filed: Apr. 8, 2008

(65) Prior Publication Data
US 2008/0247062 A1    Oct. 9, 2008

(30) Foreign Application Priority Data
Apr. 9, 2007    (JP)    ............... 2007-101798

(51) Int. Cl.
*G02B 17/00*    (2006.01)
(52) U.S. Cl. .............. 359/736; 359/680; 359/681; 359/682
(58) Field of Classification Search ........... 359/736, 359/680, 681, 682, 761, 762, 781, 782, 783, 359/786, 787, 789, 790
See application file for complete search history.

(56) References Cited

U.S. PATENT DOCUMENTS

| 5,331,467 | A  | * | 7/1994 | Sato  | ............ | 359/731 |
| 7,486,446 | B2 | * | 2/2009 | Mihara | ............ | 359/680 |

FOREIGN PATENT DOCUMENTS

JP    2000-322564 A    11/2000

* cited by examiner

*Primary Examiner*—Timothy J Thompson
(74) *Attorney, Agent, or Firm*—Pillsbury Winthrop Shaw Pittman, LLP

(57) ABSTRACT

An observation optical system has a negative lens unit including a cemented lens, arranged at the most object-side position; an annular reflecting mirror placed on the image side of the negative lens unit, with a reflecting surface facing the image side; and an imaging lens unit arranged on the image side of the negative lens unit and the annular reflecting mirror.

12 Claims, 2 Drawing Sheets

OBSERVATION OPTICAL SYSTEM

This application claims benefits of Japanese Patent Application No. 2007-101798 filed in Japan on Apr. 9, 2007, the contents of which are incorporated herein by reference.

BACKGROUND OF THE INVENTION

1. Field of the Invention

This invention relates to an observation optical system, and in particular, to an observation optical system in which an ordinary forward observation is made and at the same time, a backward observation can also be made.

2. Description of Related Art

As a conventional observation optical system in which the forward observation and the backward observation can be made at the same time, an optical system set forth, for example, in Japanese Patent Kokai No. 2000-322564 is available. This optical system is related to an omnidirectional visual sensor and includes a wide-angle lens and a curved-surface-shaped reflecting mirror. The wide-angle lens is provided to image visual information in horizontal and upward directions. The curved-surface-shaped reflecting mirror is placed at the lower portion (on the image pickup side) of the wide-angle lens and is used to image visual information in horizontal and downward directions. The visual information obtained through the wide-angle lens and the curved-surface-shaped reflecting mirror is imaged using a common camera.

SUMMARY OF THE INVENTION

The observation optical system according to the present invention comprises a negative lens unit including a cemented lens, arranged at the most object-side position; an annular reflecting mirror placed on the image side of the negative lens unit, with a reflecting surface facing the image side; and an imaging lens unit arranged on the image side of the negative lens unit and the annular reflecting mirror.

In the observation optical system of the present invention, it is desirable that the negative lens unit and the imaging lens unit constitute a forward observation optical system and the annular reflecting mirror and the imaging lens unit constitute a backward observation optical system so that an image produced by the backward observation optical system and an image produced by the forward observation optical system are formed at different positions on an imaging plane.

In the observation optical system of the present invention, it is desirable that the negative lens unit and the annular reflecting mirror are cemented.

In the observation optical system of the present invention, it is desirable that an area in which a dead angle is formed with respect to both the negative lens unit and the annular reflecting mirror is provided on the side of the negative lens unit and the annular reflecting mirror, and an illumination means is placed in the area in which the dead angle is formed.

In the observation optical system of the present invention, it is desirable that the forward observation optical system and the backward observation optical system have an aperture stop common to each other.

It is desirable that the observation optical system of the present invention is used in an endoscope.

These and other features and advantages of the present invention will become apparent from the following detailed description of the preferred embodiments when taken in conjunction with the accompanying drawings.

DETAILED DESCRIPTION OF THE PREFERRED EMBODIMENT

Figure 1:
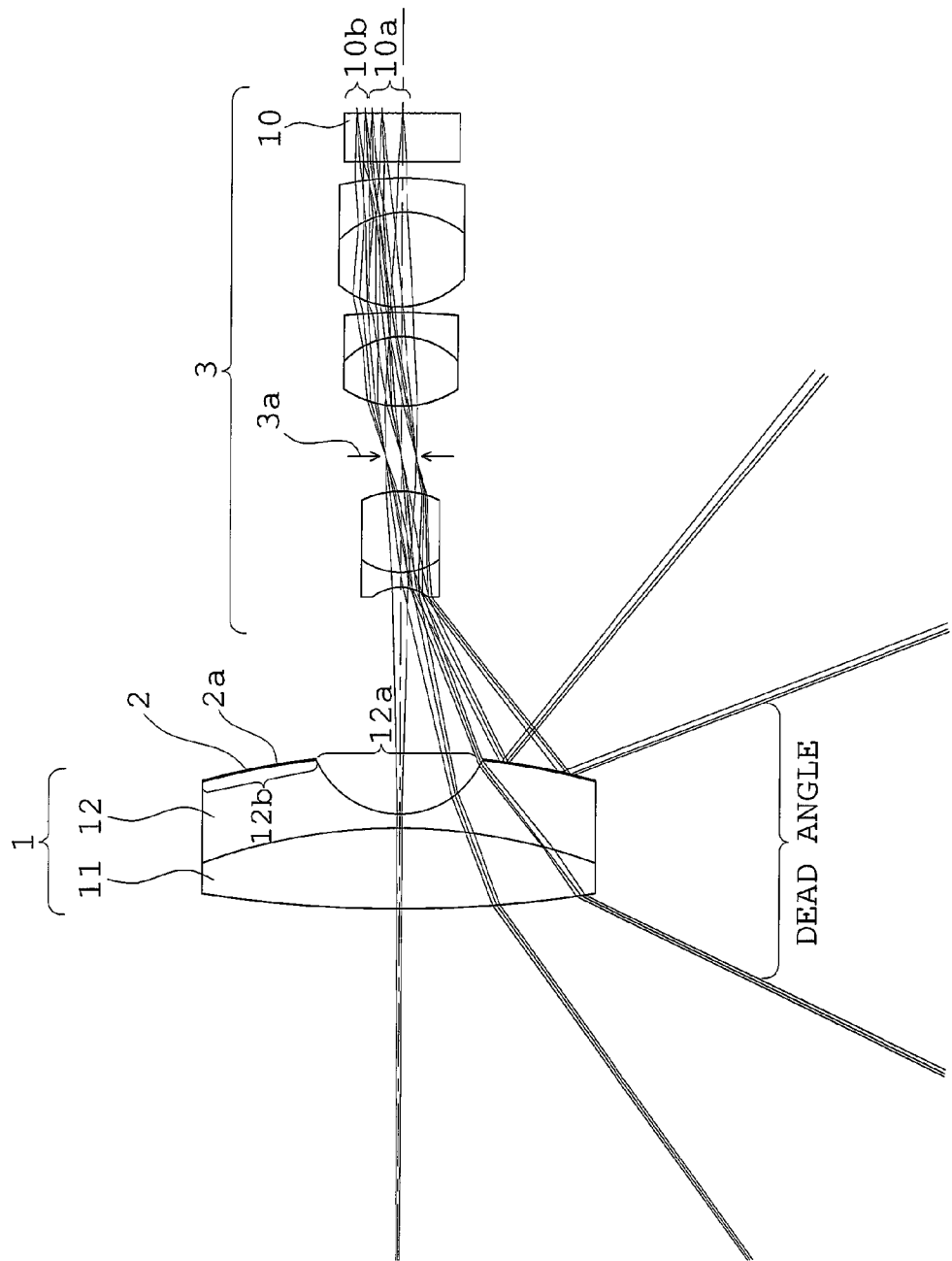
FIG. 1 is an explanatory view showing a schematic arrangement of the observation optical system according to one embodiment of the present invention.
Figure 2:
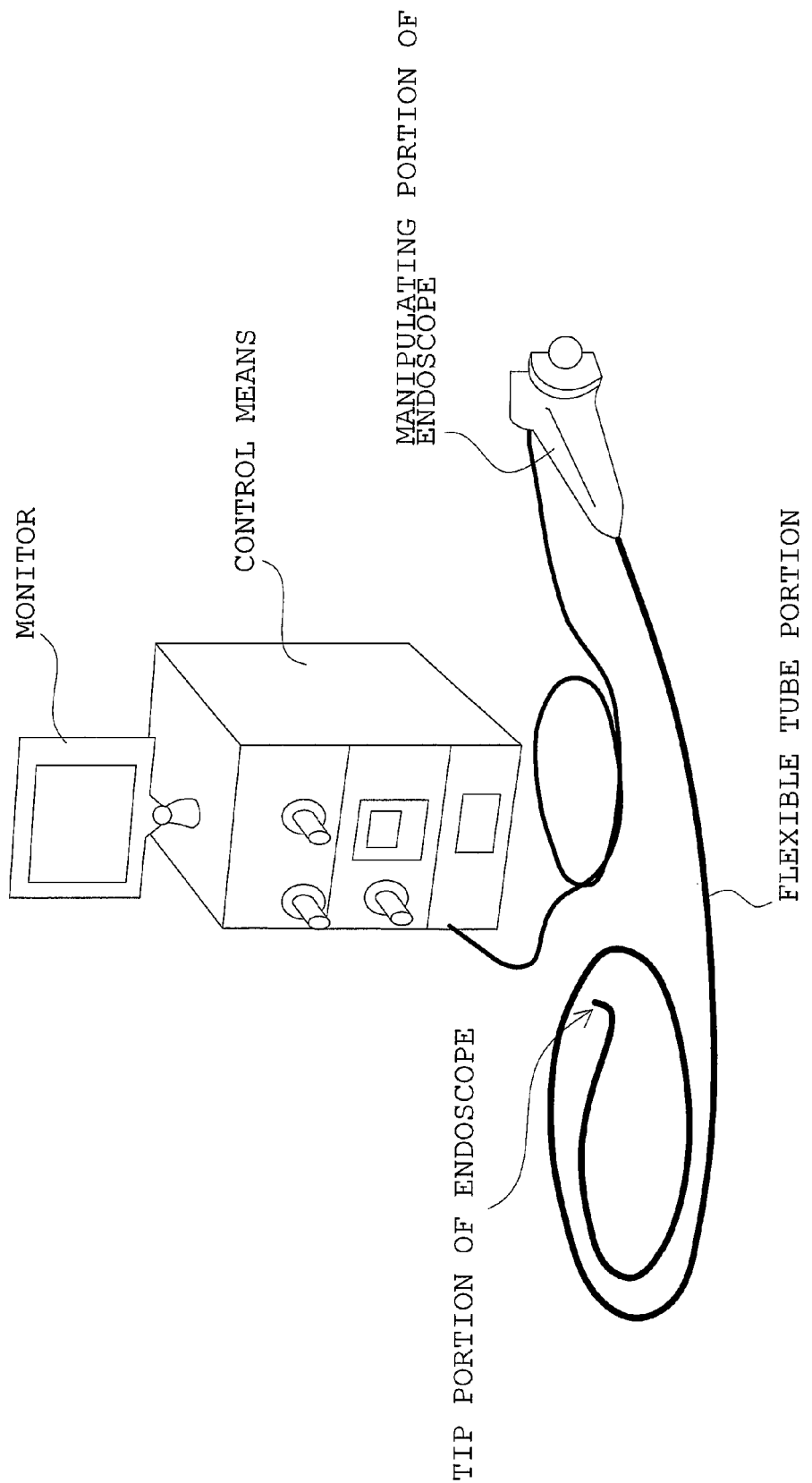
FIG. 2 is a general view showing an endoscope apparatus provided with the observation optical system of FIG. 1.

FIG. 1 shows a schematic arrangement of the observation optical system according to one embodiment of the present invention. FIG. 2 shows an endoscope system provided with the observation optical system of FIG. 1.

The observation optical system of the embodiment is an endoscope observation optical system provided at the distal end of an endoscope shown in FIG. 2 and, as shown in FIG. 1, is constructed to have, in order from the object side, a negative lens unit 1, an annular reflecting mirror 2, and an imaging lens unit 3. Also, in FIG. 1, reference numeral 10 denotes an imaging plane, at which the image pickup surface of an image sensor is placed in the embodiment.

The negative lens unit 1 includes a cemented lens having an achromatic effect and is arranged at the most object-side position so that incident light from a front visual field is transmitted and divergent light is made to emerge toward the imaging lens unit 3.

The cemented lens is constructed to cement, in order from the object side, a biconvex lens 11 and a lens 12. The lens 12 is configured so that its object-side surface is concave, the most image-side effective diameter portion is concave, and a diameter portion larger than the effective diameter is convex. The cemented lens is such that the biconvex lens 11 and the lens 12 are cemented and thereby mutual chromatic aberrations of magnification are neutralized.

The annular reflecting mirror 2 is configured so that its inside diameter is larger than the effective diameter of the most image-side surface of the negative lens unit 1 (namely, the effective diameter of an exit-side lens surface 12a), and is constructed to have a reflecting surface 2a. Moreover, the annular reflecting mirror 2 is placed on the image side of the negative lens unit 1 in such a way that the reflecting surface 2a faces the image side. The annular reflecting mirror 2 is such that light incident from a rear visual field on the reflecting surface 2a is reflected by the reflecting surface 2a toward the imaging lens 3. Also, the reflecting surface 2a may be configured as a free-formed surface.

In the observation optical system of the embodiment, a lens surface 12b outside the lens surface 12a of the negative lens unit 1 and a surface opposite with the reflecting surface 2a of the annular reflecting mirror 2 are cemented.

The imaging lens unit 3 has an outside diameter (an effective diameter) through which light passing through the negative lens unit 1 and light reflected by the reflecting surface 2a are both passed.

The imaging lens unit 3 is constructed so that light from the front visual field leaving the negative lens unit 1 is imaged at a middle 10a of the imaging plane 10 and light from the rear visual field reflected by the reflecting surface 2a of the annular reflecting mirror 2 is imaged on a periphery 10b of the imaging plane 10. In this way, the observation optical system of the embodiment is such that the forward observation optical system is constructed with the negative lens unit 1 and the imaging lens unit 3 and the backward observation optical system is constructed with the annular reflecting mirror 2 and the imaging lens unit 3. In addition, the imaging lens unit 3 has an aperture stop 3a common to the forward observation optical system and the backward observation optical system.

According to the observation optical system of the embodiment constructed as mentioned above, the light from the front visual field is incident on the negative lens unit 1, and the light leaving the lens surface 12a is incident on the imaging lens unit 3 and is imaged through the imaging lens unit 3 at the middle 10a of the imaging plane 10. At the same time, the light from the rear visual field is incident on the reflecting surface 2a of the annular reflecting mirror 2, and after being reflected by the reflecting surface 2a, is imaged through the imaging lens unit 3 on the periphery 10b of the imaging plane 10. Whereby, the front visual field and the rear visual field can be observed at the same time.

The observation optical system of the embodiment, as described above, is provided with the forward observation optical system and the backward observation optical system. Consequently, for example, in an endoscope field in which the interior of the large intestine is observed, the observation of the so-called behind folds is carried out. Specifically, the oversight of a lesion part of the behind folds can be lessened. In particular, the developments in recent years of high-vision image quality and NBI (special wavelength observation) have rendered the detection of early cancers possible. A combination with such techniques facilitates the detection of the lesion part of the behind folds (early cancer).

According to the observation optical system of the embodiment, in the observation of the front visual field, light passes through only the negative lens unit 1 on the object side of the imaging lens unit 3. On the other hand, in the observation of the rear visual field, light is reflected by only the annular reflecting mirror 2 on the object side of the imaging lens unit 3 and does not pass through another optical system. Here, since the negative lens unit 1 is constructed with the cemented lens, chromatic aberration of magnification is corrected with respect to the light passing through the negative lens unit 1. On the other hand, since the annular reflecting mirror 2 is the reflecting surface, chromatic aberration of magnification is not produced by the light reflected by the annular reflecting mirror 2. By such an arrangement, chromatic aberration of magnification produced by the light leaving the negative lens unit 1 can be made nearly equal to chromatic aberration of magnification by the light reflected by the annular reflecting mirror 2. Chromatic aberration of magnification of the imaging lens unit 3 itself is favorably corrected and thereby chromatic aberration of magnification can be favorably corrected in each of the forward observation and the backward observation.

Further, according to the observation optical system of the embodiment, the light reflected by the annular reflecting mirror 2 passes through the imaging lens unit 3. Here, in order to sufficiently ensure the region of the rear visual field or to provide a desired magnification, the annular reflecting mirror 2 has the shape of a curved surface. Thus, the light reflected by the annular reflecting mirror 2 involves distortion and astigmatism. The light reflected by the annular reflecting mirror 2, however, passes through the imaging lens unit 3, and hence produced aberrations can be favorably corrected by the imaging lens unit 3.

According to the observation optical system of the embodiment, therefore, in the forward and backward observations of the visual fields, the observations of favorable images or favorable pictures can be obtained at the same time. Consequently, when the observation optical system is used, for example, for a conventional endoscope observation, notably for the endoscope observation of the interior of the large intestine, the oversight of the lesion part of the behind folds can be considerably lessened.

In the observation optical system of the embodiment, the negative lens unit 1 and the annular reflecting mirror 2 are cemented. The negative lens unit 1 and the annular reflecting mirror 2 may be basically separately arranged. However, as the annular reflecting mirror 2 is moved away from the negative lens unit 1, the annular reflecting mirror 2 approaches the imaging lens unit 3. In this case, reflected light from the annular reflecting mirror 2 is made incident on the imaging lens unit 3 at a short distance, and thus aberrations become liable to deteriorate. When an attempt is made to move the imaging lens unit 3 farther away from the annular reflecting mirror 2 in order to avoid this problem, a distance between the negative lens unit 1 and the imaging lens unit 3 increases. In this case, since a light beam emerging from the negative lens unit 1 is spread, the optical system becomes bulky.

From the above description, it is desirable to cement the negative lens unit 1 and the annular reflecting mirror 2. By doing so, the spread of the light beam diverging from the negative lens unit 1 can be suppressed. Whereby, the diameter of the annular reflecting mirror 2 located on the image side of the negative lens unit 1 can be made small. Moreover, the outside diameter of the imaging lens unit 3 can also be made small. As a result, the diameter of the entire observation optical system can be reduced.

Further, in the observation optical system of the embodiment, an area in which a dead angle is formed is provided between a forward observation range and a backward observation range. The negative lens unit 1, the annular reflecting mirror 2, and the imaging lens unit 3 are designed so that such a dead angle is formed. The area of this dead angle can be formed, for example, in a direction perpendicular to the optical axis and on the side of the negative lens unit 1 and the annular reflecting mirror 2. It is desirable that an illumination light source is placed in the area of the dead angle. The illumination light source may be provided independently for each of the forward observation and the backward observation. Alternatively, a light source common to both the forward observation and the backward observation may be provided. In this way, oversizing of the entire observation apparatus can be suppressed. In particular, the effect of suppressing oversizing as far as possible is prominent in the observation apparatus such as the endoscope.

According to the observation optical system of the embodiment, the imaging lens unit 3 has the aperture stop 3a common to the forward observation optical system and the backward observation optical system. Hence, the number of members for adjusting the amount of light in the forward observation and the backward observation can be reduced and a compacter design of the entire observation optical system can be achieved.

In the observation optical system of the embodiment, the reflecting surface 2a of the annular reflecting mirror 2 is configured as a concave surface with curvature and an observation magnification can be brought to a desired magnification by providing a desired curvature so that a backward observation image can be observed at the same magnification as a forward observation image. Furthermore, in this case, when the reflecting surface 2a of the annular reflecting mirror 2 is configured as a free-formed surface, the thickness of the annular reflecting mirror 2 can be made smaller and a compacter design of the entire observation optical system can be achieved.

Also, although the embodiment has been described by using an example of an ordinary endoscope observation optical system, the observation optical system of the present invention is applicable to a capsule endoscope as well. The observation optical system of the present invention is not limited to the endoscope observation optical system, but it is also applicable to observation optical systems used in other applications excluding the endoscope observation.

According to the observation optical system of the embodiment, aberrations in both the forward observation and the backward observation can be, favorably corrected at the same time. As a result, in the forward and backward observations of the visual fields, the observation optical system which is capable of obtaining the observations of images in which aberrations are favorably corrected or pictures is acquired.

The observation optical system of the embodiment is useful in the field in which it is needed that the front and rear visual fields are observed with a high degree of accuracy at the same time, particularly in the endoscope observation of the interior of the large intestine.

What is claimed is:

1. An observation optical system comprising:
    a negative lens unit including a cemented lens, arranged at a most object-side position;
    an annular reflecting mirror placed on an image side of the negative lens unit, with a reflecting surface facing the image side; and
    an imaging lens unit arranged on the image side of the negative lens unit and the annular reflecting mirror,
    wherein the negative lens unit and the imaging lens unit constitute a forward observation optical system and the annular reflecting mirror and the imaging lens unit constitute a backward observation optical system so that an image produced by the backward observation optical system and an image produced by the forward observation optical system are formed at different positions on an imaging plane.

2. An observation optical system according to claim 1, wherein the negative lens unit and the annular reflecting mirror are cemented.

3. An observation optical system comprising:
    a negative lens unit including a cemented lens, arranged at a most object-side position;
    an annular reflecting mirror placed on an image side of the negative lens unit, with a reflecting surface facing the image side; and
    an imaging lens unit arranged on the image side of the negative lens unit and the annular reflecting mirror, wherein an area in which a dead angle is formed with respect to both the negative lens unit and the annular reflecting mirror is provided on a side of the negative lens unit and the annular reflecting mirror, and an illumination means is placed in the area in which the dead angle is formed.

4. An observation optical system according to claim 1, wherein the forward observation optical system and the backward observation optical system have an aperture stop common to each other.

5. An observation optical system comprising:
    a negative lens unit including a cemented lens, arranged at a most object-side position;
    an annular reflecting mirror placed on an image side of the negative lens unit, with a reflecting surface facing the image side; and
    an imaging lens unit arranged on the image side of the negative lens unit and the annular reflecting mirror, wherein the negative lens unit and the imaging lens unit constitute a forward observation optical system and the annular reflecting mirror and the imaging lens unit constitute a backward observation optical system; the negative lens unit and the annular reflecting mirror are cemented; an image produced by the backward observation optical system and an image produced by the forward observation optical system are formed at different positions on an imaging plane; and the forward observation optical system and the backward observation optical system have an aperture stop common to each other.

6. An observation optical system comprising:
    a negative lens unit including a cemented lens, arranged at a most object-side position;
    an annular reflecting mirror placed on an image side of the negative lens unit, with a reflecting surface facing the image side; and
    an imaging lens unit arranged on the image side of the negative lens unit and the annular reflecting mirror, wherein the negative lens unit and the imaging lens unit constitute a forward observation optical system and the annular reflecting mirror and the imaging lens unit constitute a backward observation optical system; an area in which a dead angle is formed with respect to both the negative lens unit and the annular reflecting mirror is provided on a side of the negative lens unit and the annular reflecting mirror and an illumination means is placed in the area in which the dead angle is formed; an image produced by the backward observation optical system and an image produced by the forward observation optical system are formed at different positions on an imaging plane; and the forward observation optical system and the backward observation optical system have an aperture stop common to each other.

7. An observation optical system according to claim 1, used in an endoscope.

8. An observation optical system according to claim 2, used in an endoscope.

9. An observation optical system according to claim 3, used in an endoscope.

10. An observation optical system according to claim 4, used in an endoscope.

11. An observation optical system according to claim 5, used in an endoscope.

12. An observation optical system according to claim 6, used in an endoscope.

* * * * *